(12) United States Patent
Huang et al.

(10) Patent No.: US 9,842,249 B2
(45) Date of Patent: Dec. 12, 2017

(54) GESTURE RECOGNITION METHOD AND APPARATUS WITH IMPROVED BACKGROUND SUPPRESSION

(71) Applicant: PixArt Imaging Inc, Hsin-chu County (TW)

(72) Inventors: Yu-Hao Huang, Hsin-chu (TW); Ming-Tsan Kao, Hsin-chu (TW); Sen-Huang Huang, Hsin-chu (TW)

(73) Assignee: PIXART IMAGING INC., Hsin-Chu County (TW)

( * ) Notice: Subject to any disclaimer, the term of this patent is extended or adjusted under 35 U.S.C. 154(b) by 396 days.

(21) Appl. No.: 13/940,744

(22) Filed: Jul. 12, 2013

(65) Prior Publication Data
US 2014/0023230 A1    Jan. 23, 2014

(30) Foreign Application Priority Data

Jul. 18, 2012  (TW) .............................. 101125964 A (51) Int. Cl.
*G06K 9/00* (2006.01)
*G06T 7/60* (2017.01)
*G06T 7/50* (2017.01)

(52) U.S. Cl.
CPC ............ *G06K 9/00335* (2013.01); *G06T 7/60* (2013.01); *G06T 7/50* (2017.01)

(58) Field of Classification Search
USPC ............... 345/156, 157, 158, 419, 428, 666; 348/208.14, 43, 148, 607; 375/240.6; 382/103, 107, 154, 167, 224, 275
See application file for complete search history.

(56) References Cited

U.S. PATENT DOCUMENTS

| | | | | |
|---|---|---|---|---|
| 7,720,280 | B2 * | 5/2010 | Kim et al. | 382/167 |
| 7,969,470 | B2 * | 6/2011 | Kishida | 348/208.14 |
| 8,023,767 | B1 * | 9/2011 | Ning et al. | 382/275 |
| 8,237,655 | B2 * | 8/2012 | Yabe et al. | 345/157 |
| 8,416,189 | B2 * | 4/2013 | Lou et al. | 345/158 |
| 8,670,073 | B2 * | 3/2014 | Zhong et al. | 348/607 |
| 8,711,221 | B2 * | 4/2014 | Eggert et al. | 348/148 |
| 8,837,593 | B2 * | 9/2014 | Nishi | H04N 5/145 375/240.16 |
| 9,094,606 | B2 * | 7/2015 | Streeter | G01S 17/36 |
| 2005/0123052 | A1 * | 6/2005 | Rabinowitz | H04N 19/142 375/240.24 |

(Continued)

FOREIGN PATENT DOCUMENTS

TW    201137766 A    11/2011
TW    201220129 A    5/2012

*Primary Examiner* — Xuemei Chen
(74) *Attorney, Agent, or Firm* — Hauptman Ham, LLP (57) ABSTRACT

A gesture recognition method with improved background suppression includes the following steps. First, a plurality of images are sequentially captured. Next, a position of at least one object in each of the images is calculated to respectively obtain a moving vector of the object at different times. Then, an average brightness of the object in each of the images is calculated. Finally, magnitudes of the moving vectors of the object at different times are respectively adjusted according to the average brightness of the object in each of the images. There is further provided a gesture recognition apparatus using the method mentioned above.

12 Claims, 6 Drawing Sheets

(56) References Cited

U.S. PATENT DOCUMENTS

| | | | |
|---|---|---|---|
| 2008/0129875 A1* | 6/2008 | Lei | H04N 5/144 348/700 |
| 2010/0231593 A1* | 9/2010 | Zhou et al. | 345/428 |
| 2011/0267258 A1* | 11/2011 | Wang et al. | 345/156 |
| 2011/0268365 A1* | 11/2011 | Lou et al. | 382/224 |
| 2011/0299737 A1* | 12/2011 | Wang et al. | 382/107 |
| 2012/0075291 A1* | 3/2012 | Sohn | 345/419 |
| 2012/0119991 A1* | 5/2012 | Tsai et al. | 345/158 |
| 2012/0163459 A1* | 6/2012 | Tsyrganovich | 375/240.16 |
| 2013/0070049 A1* | 3/2013 | Ha et al. | 348/43 |
| 2013/0285899 A1* | 10/2013 | Huang et al. | 345/156 |
| 2013/0293589 A1* | 11/2013 | Hwang | 345/666 |
| 2014/0079285 A1* | 3/2014 | Yamashita et al. | 382/103 |
| 2014/0334716 A1* | 11/2014 | Lee et al. | 382/154 |
| 2014/0347263 A1* | 11/2014 | Dai et al. | 345/156 |

\* cited by examiner

GESTURE RECOGNITION METHOD AND APPARATUS WITH IMPROVED BACKGROUND SUPPRESSION

CROSS REFERENCE TO RELATED APPLICATION

This application claims the priority benefit of Taiwan Patent Application Serial Number 101125964, filed on Jul. 18, 2012, the full disclosure of which is incorporated herein by reference.

BACKGROUND

1. Field of the Disclosure

This disclosure generally relates to a gesture recognition method and apparatus and, more particularly, to a gesture recognition method and a gesture recognition apparatus with improved background suppression.

2. Description of the Related Art

Figure 1A:
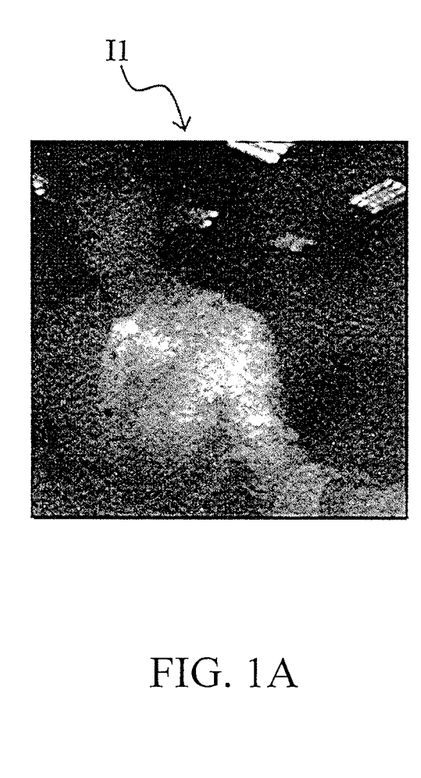
FIGS. 1A to 1E are schematic diagrams showing the gesture of a user moving from left to right.
Figure 1B:
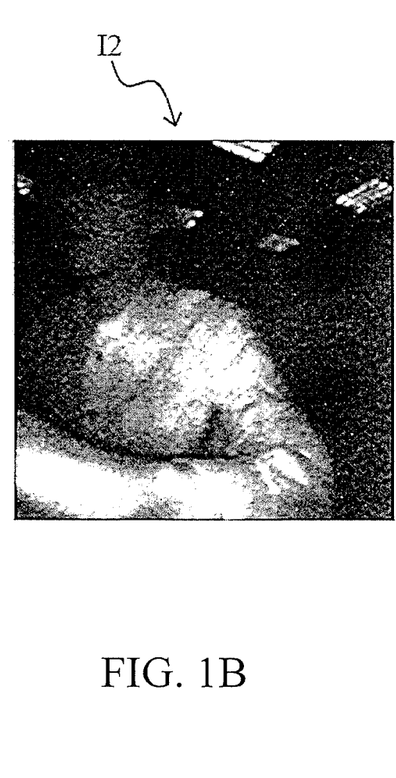
Figure 1C:
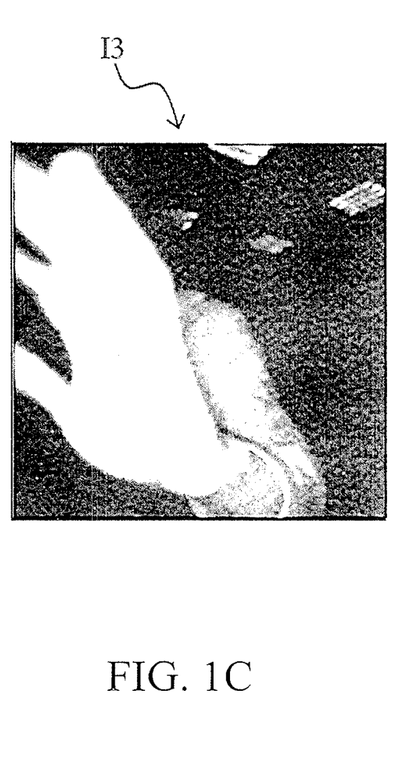
Figure 1D:
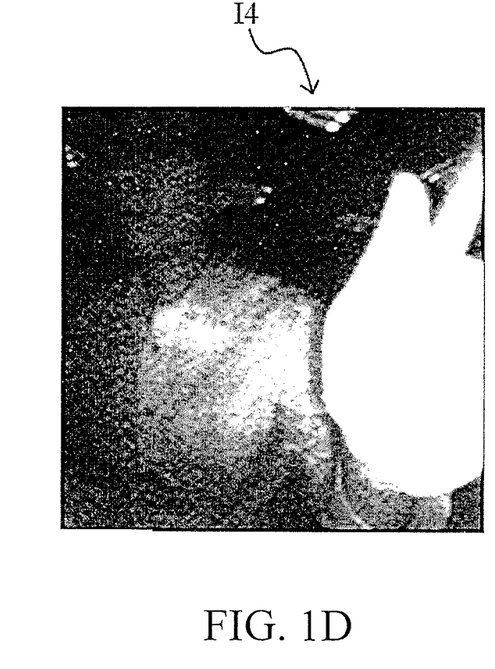
Figure 1E:
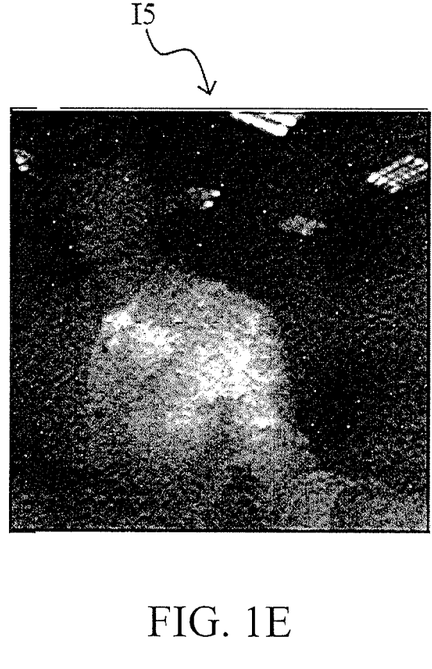
Figure 1F:
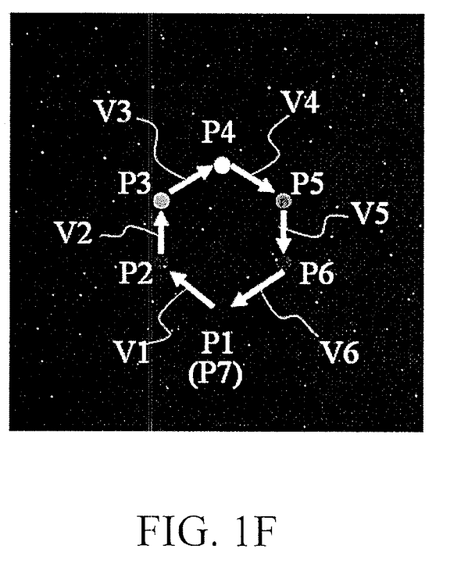
FIG. 1F shows a schematic diagram of the motion track of a gravity center of the object in FIGS. 1A to 1F.

FIGS. 1A-1E are schematic diagrams showing the gesture of a user moving from left to right and FIG. 1F shows a schematic diagram of the motion track of a gravity center of the object in FIGS. 1A-1E. Referring to FIG. 1A, the hand of the user is not moved at first and the body of the user, referred as a background image, can be seen in an image I1 of FIG. 1A. Next, it can be seen that the hand of the user is moved from left to right in FIGS. 1B-1D in which the hand of the user gradually becomes larger and brighter at first and then gradually becomes smaller and darker, and finally only the background image, i.e. the body of the user, is left.

Generally speaking, gravity centers P1-P7 of an object are calculated according to the brightness and positions of pixels of the object and served as the position of the object, and moving vectors V1-V6 at different times are also calculated. Details of calculating the gravity centers may be referred to U.S. Publication No. 2013/0265230 assigned to the same assignee as the present application. However from FIGS. 1A-1E, it can be seen that when images I1-I5 captured by the image sensor contain background brightness (i.e. the background image), the gravity centers of the object may be at the same location before and after the hand of the user is waving, shown as the gravity centers P1 and P7 in FIG. 1F. Accordingly, a circle track can be obtained as FIG. 1F when the object has a motion track as FIGS. 1A-1E, wherein the hand of the user does not appear in FIGS. 1A and 1E. Therefore, a final gravity center of the object may fall at the same location as an initial gravity center of the object; i.e. a displacement $\Delta x=0$ as shown in FIG. 1F.

In other words, if the hand of the user is waved from left to right, the gravity centers P1-P7 of the object will like the track shown in FIG. 1F, wherein as the displacement $\Delta x=0$, the processor may recognize that the gesture is a circle motion such that an error may occur in recognition.

SUMMARY

The present disclosure provides a gesture recognition method that may adjust moving vectors according to the brightness or size of the object image so as to reduce the background interference and to improve the gesture recognition performance.

The present disclosure further provides a gesture recognition apparatus that may utilize the method mentioned above so as to improve the gesture recognition performance.

Other objects and advantages of the present disclosure will become more apparent from the technical features of the present disclosure.

To achieve one, a part of or all objects above or other objects, one embodiment of the present disclosure provides a gesture recognition method with improved background suppression including following steps. First, a plurality of images are sequentially captured. Next, a position of at least one object in each of the plurality of images is calculated to respectively obtain a moving vector of the object at different times. Then, an average brightness of the object in each of the plurality of images is calculated. Finally, magnitudes of the moving vectors of the object at different times are respectively adjusted according to the average brightness of the object in each of the plurality of images.

In one aspect, the magnitudes of the moving vectors are positively correlated to the average brightness of the object in each of the plurality of images. In one aspect, when the average brightness of the object in each of the plurality of images is larger, a weighting of adjusting magnitudes of the moving vectors of the object at different times becomes higher. In one aspect, the weighting may be a multinomial.

In one aspect, each of the plurality of images includes at least a background image or an object image. In one aspect, the position of at least one object in each of the plurality of images is a gravity center of at least one of the background image and the object image.

In one aspect, the above method further includes the following steps. First, an average size of the object in each of the plurality of images is calculated. Next, magnitudes of the moving vectors of the object at different times are respectively adjusted according to the average brightness and the average size of the object in each of the plurality of images.

In one aspect, the above method further includes the step of obtaining a motion track of the object according to the adjusted magnitudes of the moving vectors of the object at different times.

The present disclosure further provides a gesture recognition method with improved background suppression including following steps. First, a plurality of images are sequentially captured. Next, a position of at least one object in each of the plurality of images is calculated to respectively obtain a moving vector of the object at different times. Then, an average size of the object in each of the plurality of images is calculated. Finally, magnitudes of the moving vectors of the object at different times are respectively adjusted according to the average size of the object in each of the plurality of images.

The present disclosure further provides a gesture recognition method with improved background suppression including following steps. First, a plurality of images are sequentially captured. Next, a position of at least one object in each of the plurality of images is calculated to respectively obtain a moving vector of the object at different times. Then, a distance of the object in each of the plurality of images is calculated. Finally, magnitudes of the moving vectors of the object at different times are respectively adjusted according to the distance of the object in each of the plurality of images.

In one aspect, the step of calculating a distance of the object in each of the plurality of images is to provide a distance measurement system to measure a distance of the object with respect to an image sensor at different times.

The present disclosure further provides a gesture recognition apparatus including an image sensor and a processing unit. The image sensor is configured to sequentially capture a plurality of images. The processing unit is configured to perform following steps. First, a position of at least one object in each of the plurality of images is calculated to respectively obtain a moving vector of the object at different times. Then, magnitudes of the moving vectors of the object at different times are respectively adjusted according to information of at least one of an average brightness, an average size and a shape of the object in each of the plurality of images.

As mentioned above, the gesture recognition method and the gesture recognition apparatus of the present disclosure may respectively adjust the moving vectors at different times according to the average brightness of the object at different times so as to avoid the error of the gesture recognition mechanism. In addition, in the present disclosure it is also able to respectively adjust the moving vectors at different times according to the average size or shape of the object at different times so as to achieve the above object. Furthermore, in the present disclosure it is further able to respectively adjust the weighting of the moving vectors at different times according to the distance of the object from the image sensor so as to avoid the error of the gesture recognition mechanism.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

The above or other technical contents, characteristics and effects according to the present disclosure will become more apparent from the following detailed description of a preferred embodiment in conjunction with the accompanying drawings. It is to be understood that terms of direction used herein, such as upward, downward, leftward, rightward, forward and backward, are only used for reference but not used to limit the present disclosure.

Figure 2:
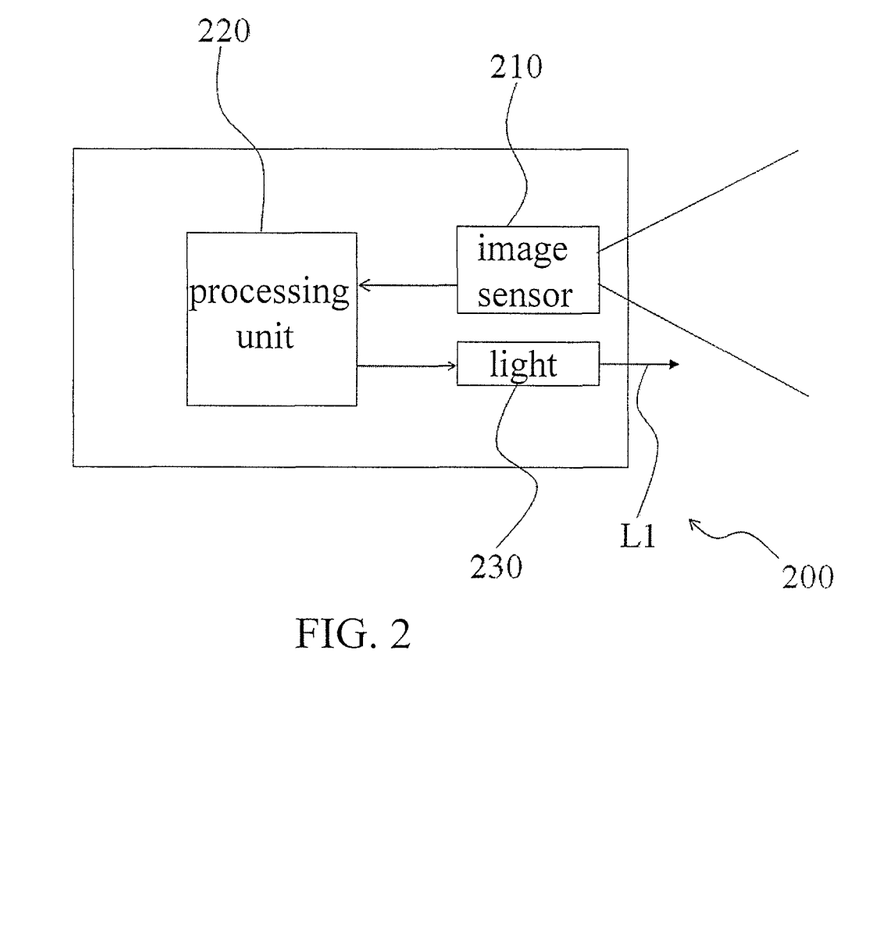
FIG. 2 shows a schematic block diagram of the gesture recognition apparatus according to an embodiment of the present disclosure.

FIG. 2 shows a schematic block diagram of the gesture recognition apparatus according to an embodiment of the present disclosure. Referring to FIG. 2, the gesture recognition apparatus 200 of the present disclosure includes an image sensor 210 and a processing unit 220. The image sensor 210 may be a Complementary Mental-Oxide-Semiconductor (CMOS) image senor or a Charge-Coupled Device (CCD) image sensor, wherein the image sensor 210 is configured to sequentially capture a plurality of images. Specifically speaking, the gesture recognition apparatus 200 of the present disclosure may include an illumination device 230, wherein the illumination device 230 is configured to provide a light beam L1. Accordingly, when an object (e.g. a hand of a user) approaches the gesture recognition apparatus 200, the image sensor 210 may receive reflection of the light beam L1 from the object so as to sequentially capture a plurality of images containing object motion, such as images I1-I5 containing hand motion as shown in FIGS. 1A-1E mentioned above. In this embodiment, an example of the light beam L1 of the illumination device 230 may be infrared light, but not limited to. The illumination device 230 may also provide a light beam L1 of other invisible spectrum. Practically, in order to capture images of the object reflecting the light beam L1, the image sensor 210 is the one capable of detecting the spectrum of the light beam L1.

Referring to FIG. 2, the processing unit 220 of this embodiment may be a digital signal processor (DSP) or other suitable processors capable of processing and analyzing images, wherein the processing unit 220 is configured to receive the plurality of images captured by the image sensor 210 and to perform the post-processing and calculation. Specifically speaking, the processing unit 220 generally respectively calculates a position of an object in each of the plurality of images (e.g. a hand gradually approaching to or leaving the image sensor 210) so as to obtain moving vectors V1-V6 of the object at different times, such as the gravity centers P1-P7 of the object shown in FIG. 1F and the moving vectors V1-V6 calculated according to the gravity centers P1-P7.

In calculation, positions of the object are generally obtained by calculating the gravity centers P1-P7 of the object according to the average brightness of the object, and the moving vectors V1-V6 at different times are also calculated. However when the images captured by the image sensor 210 contain background brightness (i.e. at least a background image is included in the images captured by the image sensor 210), the gravity centers of the object after and previous to the waving of hand may be at the same location, such as the gravity centers P1 and P7 of the object shown in FIG. 1F and the displacement Δx=0. In other words, when the hand of the user waves from left to right, the gravity centers P1-P7 of the object may be detected as the track shown in FIG. 1F, wherein as the displacement Δx=0, the processing unit 220 may recognize that the user gesture is a circle motion such that errors can occur in recognition. In order to avoid the above error, in this embodiment a weighting is added to the moving vector so as to create a new track and a new gravity center of the object. Details thereof will be described hereinafter.

Figure 3:
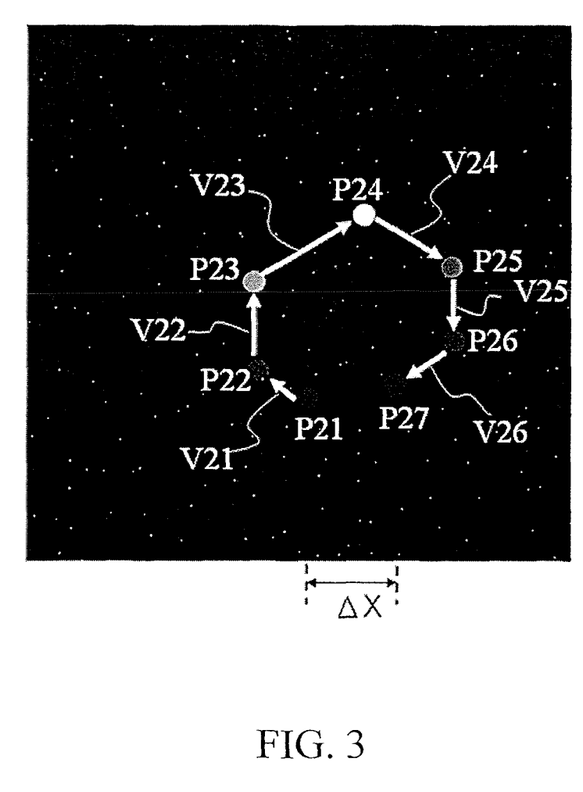
FIG. 3 shows a schematic diagram of the motion track of a gravity center formed by adjusting the moving vectors shown in FIG. 1F according to the average brightness of the object image.

Generally speaking, when the user waves his or her hand, the position of the hand is closer to the image sensor 210 than the body. Therefore, the image brightness of the hand is brighter than that of the background. In other words, in this embodiment the average brightness of the object image is served as a weighting to adjust the moving vectors V1-V6 mentioned above so as to obtain the adjusted track of the object motion and to obtain the gravity centers P21-P27 according to the adjusted moving vectors V21-V26 as shown in FIG. 3.

In this embodiment, magnitudes of the adjusted moving vectors V21-V26 are positively correlated to the average brightness of the object in each of the plurality of images, wherein when the average brightness of the object is larger, a weighting of adjusting magnitudes of the moving vectors V21-V26 of the object at different times becomes higher;

and the weighting may be a multinomial. Specifically speaking, when the object is brighter, the adjusted moving vector is larger; whereas when the object is darker, the adjusted moving vector is smaller. In this manner, the new created gravity centers P21-P27 are different from the original gravity centers P1-P7 as shown in FIG. 1F and FIG. 3. It is known from FIG. 3 that when the hand of the user is moved from left to right, as the gravity centers P21-P27 of the object is calculated using the weighted moving vectors mentioned above, the track of the gravity centers P21-P27 of the object is shown as FIG. 3, wherein as the displacement $\Delta x>0$, the processing unit 220 may recognize that the gesture of the user is from left to right. On the contrary, if the displacement $\Delta x<0$, it is able to identify that the gesture of the user is from right to left.

It should be mentioned that when the motion of the user's hand is a rotation gesture, the motion track is substantially at the same plane and thus the image brightness of the object is substantially identical. Furthermore, comparing to the waving gesture from left to right or from right to left, in the rotation gesture the condition that an object suddenly appears and approaches to the image sensor 210 and then leaves away from the image sensor 210 generally does not happen. Therefore, weighting the moving vector based on the brightness in this embodiment substantially does not affect the recognition of the rotation gesture.

It should be mentioned that in the above embodiment the average brightness of the object image is taken as an example to adjust the weighting of the moving vectors V1-V6. However, in another embodiment the weighting of the moving vectors V1-V6 may be adjusted according to the size of the object image as shown by the adjusted motion track in FIG. 4. Details thereof will be described hereinafter.

Figure 4:
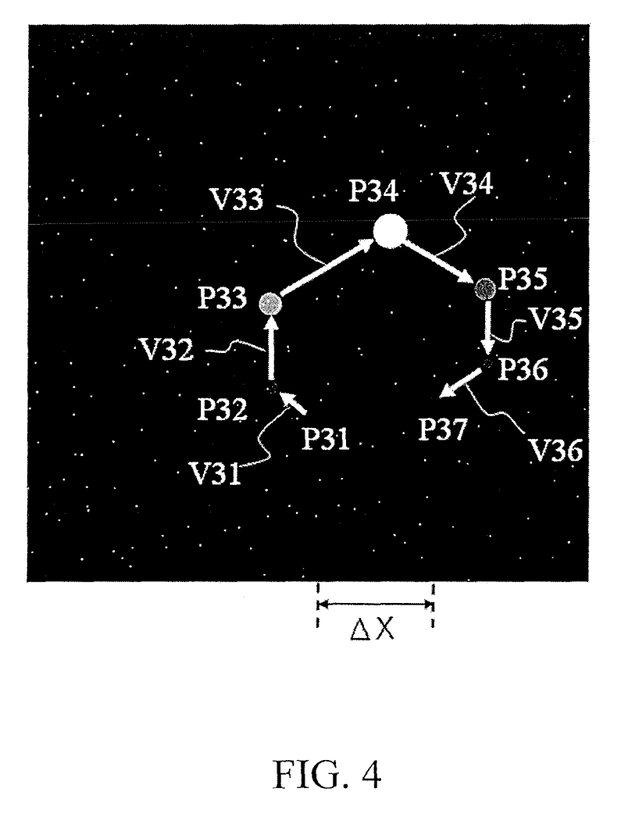
FIG. 4 shows a schematic diagram of the motion track of a gravity center formed by adjusting the moving vectors shown in FIG. 1F according to the size of the object image.

Specifically speaking, when the hand of the user is waved from left to right, the hand generally approaches to the image sensor 210 at first and then leaves away from the image sensor 210. Therefore, in this embodiment the size of the object image is served as a weighting to adjust the moving vectors V1-V6 mentioned above so as to obtain the adjusted track of the object motion and to obtain the gravity centers P31-P37 according to the adjusted moving vectors V31-V36 as shown in FIG. 4. Similarly, when the user's hand is waved from left to right, as the gravity centers P31-P37 are obtained by using the size of the object image as the weighting of the moving vectors V1-V6, the track of the gravity centers P31-P37 of the object is shown as FIG. 4, wherein as the displacement $\Delta x>0$, the processing unit 220 may recognize that the gesture of the user is from left to right. On the contrary, if the displacement $\Delta x<0$, it is able to identify that the gesture of the user is from right to left.

Similarly, when the motion of the user's hand is a rotation gesture, the motion track is substantially at the same plane and thus the image size of the object is substantially identical. Furthermore, comparing to the waving gesture from left to right or from right to left, in the rotation gesture the condition that an object suddenly appears and approaches to the image sensor 210 and then leaves away from the image sensor 210 generally does not happen. Therefore, weighting the moving vector based on the object size in this embodiment substantially does not affect the recognition of the rotation gesture. It should be mentioned that in this embodiment the weighting of the moving vectors V1-V6 may be adjusted according to both the average brightness and the size.

Figure 5:
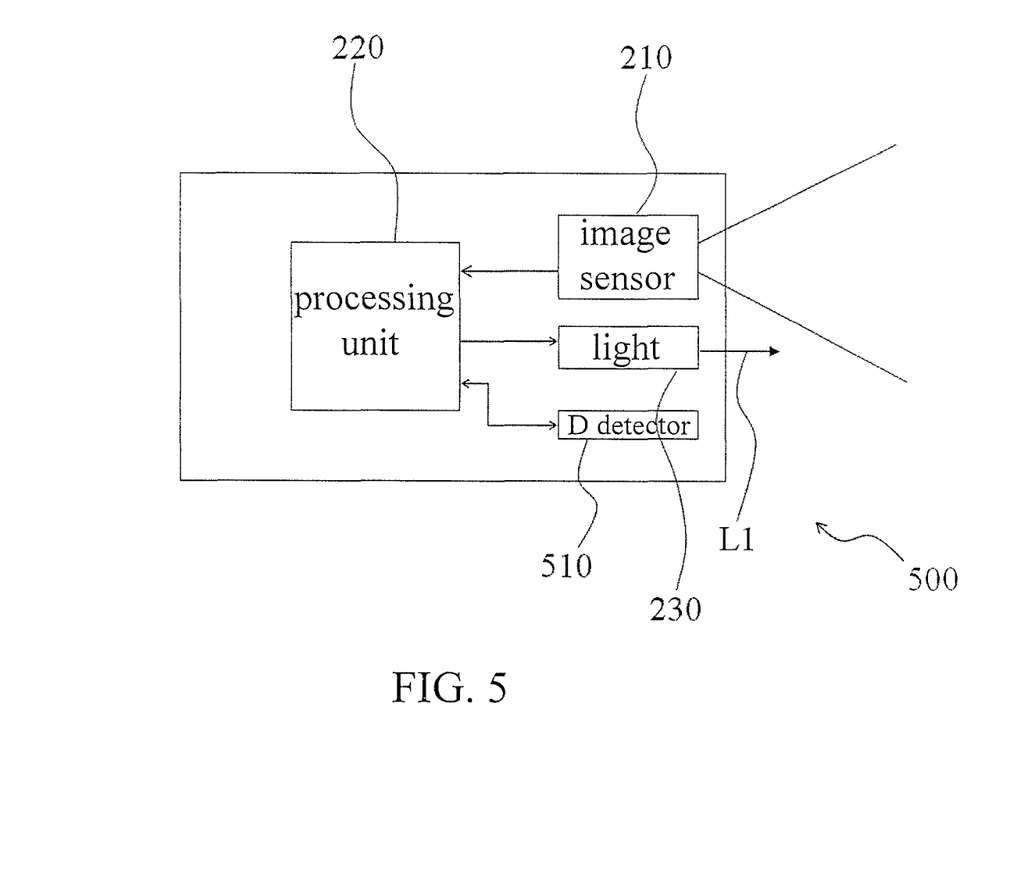
FIG. 5 shows a schematic block diagram of the gesture recognition apparatus according to another embodiment of the present disclosure.

FIG. 5 shows a schematic block diagram of the gesture recognition apparatus according to another embodiment of the present disclosure. Referring to FIG. 5, the gesture recognition apparatus 500 of this embodiment is similar to the gesture recognition apparatus 200 mentioned above. The difference is that in this embodiment the gesture recognition apparatus 500 further includes a distance measurement system 510, wherein the distance measurement system 510 is configured to measure the distance of the object from the image sensor 210 at different times, and the processing unit 220 is configured to respectively adjust the weighting of the moving vectors V1-V6 at different times according to the distance of the object with respect to the image sensor 210 so as to avoid the error of the gesture recognition apparatus 500, wherein the weighted track is similar to those shown in FIGS. 3 and 4 and thus details thereof are not repeated herein.

It should be mentioned that when the motion of the user's hand is a rotation gesture, the motion track is substantially at the same plane and thus distances of the object from the image sensor 210 at different times are substantially identical. Furthermore, comparing to the waving gesture from left to right or from right to left, in the rotation gesture the condition that an object suddenly appears and approaches to the image sensor 210 and then leaves away from the image sensor 210 generally does not happen. Therefore, weighting the moving vector based on the distance of the object from the image sensor 210 at different times in this embodiment substantially does not affect the recognition of the rotation gesture.

As mentioned above, the gesture recognition method and the gesture recognition apparatus of the present disclosure at least have the merits below. First, in the present disclosure it is able to respectively adjust the moving vectors at different times according to the average brightness of the object at different times so as to avoid the error of the gesture recognition mechanism. In addition, in the present disclosure it is also able to respectively adjust the moving vectors at different times according to the average size or shape of the object at different times so as to achieve the same object. Furthermore, in the present disclosure it is further able to respectively adjust the weighting of the moving vectors at different times according to the distance of the object with respect to the image sensor so as to avoid the error of the gesture recognition mechanism.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed. Furthermore, any embodiment or claim of the present invention is not necessary to achieve all objects, advantages, and novel features disclosed herein. Meanwhile, the summary and title are only for searching of patent documents but not to limit the present disclosure.

What is claimed is:

1. A gesture recognition method with improved background suppression, the method comprising:
sequentially capturing a plurality of images;
calculating a position of at least one object in each of the plurality of images to respectively obtain a moving vector of the object at different times;
calculating an average brightness and a size of the object in each of the plurality of images; and
respectively adjusting magnitudes of the moving vectors of the object at the different times according to the average brightness and the size of the object in each of the plurality of images, wherein said adjusting comprises a weighting of the magnitudes of the moving vectors of the object at the different times, and said weighting is positively correlated to the average brightness and the size of the object in each of the plurality of images to cause the adjusted moving vectors of the object to be larger when the average brightness of the object is brighter and the size of the object is larger, and the adjusted moving vectors of the object to be smaller when the average brightness of the object is darker and the size of the object is smaller.

2. The gesture recognition method as claimed in claim 1, wherein the weighting is a multinomial.

3. The gesture recognition method as claimed in claim 1, wherein each of the plurality of images comprises at least a background image or an object image.

4. The gesture recognition method as claimed in claim 3, wherein the position of at least one object in each of the plurality of images is a gravity center of at least one of the background image and the object image.

5. The gesture recognition method as claimed in claim 1, further comprising:
  obtaining a motion track of the object according to the adjusted magnitudes of the moving vectors of the object at the different times.

6. A gesture recognition method with improved background suppression, the method comprising:
  sequentially capturing a plurality of images;
  calculating a position of at least one object in each of the plurality of images to respectively obtain a moving vector of the object at different times;
  calculating a size of the object in each of the plurality of images; and
  respectively adjusting magnitudes of the moving vectors of the object at the different times according to the size of the object in each of the plurality of images,
  wherein said adjusting comprises a weighting of the magnitudes of the moving vectors of the object at the different times, and said weighting is positively correlated to the size of the object in each of the plurality of images to cause the adjusted moving vectors of the object to be larger when the size of the object is larger and the adjusted moving vectors of the object to be smaller when the size of the object is smaller.

7. The gesture recognition method as claimed in claim 6, wherein the weighting is a multinomial.

8. The gesture recognition method as claimed in claim 6, wherein each of the plurality of images comprises at least a background image or an object image.

9. The gesture recognition method as claimed in claim 8, wherein the position of at least one object in each of the plurality of images is a gravity center of at least one of the background image and the object image.

10. The gesture recognition method as claimed in claim 6, further comprising:
  obtaining a motion track of the object according to the adjusted magnitudes of the moving vectors of the object at the different times.

11. A gesture recognition apparatus, comprising:
  an image sensor configured to sequentially capture a plurality of images; and
  a processing unit configured to perform following steps:
  calculating a gravity center of an object in each of the plurality of images to respectively obtain a moving vector of the object at different times; and
  respectively adjusting magnitudes of the moving vectors of the object at the different times according to a size of the object in each of the plurality of images,
  wherein said adjusting comprises a weighting of the magnitudes of the moving vectors of the object at the different times, and said weighting is positively correlated to the size of the object in each of the plurality of images to cause
  the adjusted moving vectors of the object to be larger when the size of the object is larger, and
  the adjusted moving vectors of the object to be smaller when the size of the object is smaller.

12. The gesture recognition apparatus as claimed in claim 11, wherein said weighting is further positively correlated to the average brightness of the object in each of the plurality of images and the processing unit is configured to perform said weighting to cause
  the adjusted moving vectors of the object to be larger when the average brightness of the object is brighter, and
  the adjusted moving vectors of the object to be smaller when the average brightness of the object is darker.

* * * * *